Patented Sept. 11, 1934

1,973,660

UNITED STATES PATENT OFFICE 1,973,660

HYDRAULIC PRESSURE FLUID

John B. Robinson, Chicago, Ill., assignor to Chicago Hydraulic Oil Co., a corporation of Illinois No Drawing. Application March 28, 1933, Serial No. 663,181

5 Claims. (Cl. 252—5)

The invention relates to the composition of a fluid particularly adapted for use in hydraulic brakes, shock absorbers or other fluid pressure actuated mechanism depending for its efficiency upon the viscosity of the fluid under all working and temperature conditions.

An object of the invention is to provide an improved fluid for the purpose referred to, having an extremely low freezing point.

Another object is to provide a fluid having an evener range of viscosity than prior known fluids for the purpose referred to.

Another object is to provide a fluid for hydraulic mechanisms which has little deteriorating effect upon rubber packing and metals.

The improved fluid consists of a mixture of glucose or molasses, alcohol and water, with or without an infinitesimal quantity of a suitable rust inhibitor, such as for example sodium chromate. Prior known fluids of the character used in hydraulic mechanisms, particularly hydraulic brakes, obtain various disadvantages. Such known fluids, containing castor oil as now generally used, are objectionable in view of their harmful effect upon the rubber packing and metals constituting the mechanical parts of the hydraulic system. Castor oil has the known effect of causing the rubber packing to swell, thus making for inefficient operation, undue wear, and ultimate leakage. Other known fluids including, as an essential ingredient glycerine, which, while having no apparent detrimental effect upon rubber, increases corrosion of the metals, causing the parts to stick, undue wear and often breakage. The fluids containing castor oil or glycerine also have a relatively high freezing point as compared with the improved composition. Because of this relatively high freezing point the range of viscosity is uneven thus, as particularly noted in hydraulic brake systems, making for inefficient operation.

The improved liquid overcomes all the objections outlined in the foregoing, the low freezing point (which tests at 75 degrees below freezing) insuring an even range of viscosity under temperatures normally encountered while in use.

As hereinbefore indicated, the mixture consists of glucose, in quantities ranging from 20 to 75% and the remaining per cent of a prepared mixture preferably consisting of equal parts of alcohol and water. Conditions encountered in various applications and uses results in the wide variance in the proportions used. Where the temperature is certain not to reach a predetermined low point the glucose or molasses may be used in an increased proportion, thus decreasing the alcohol and water content, without decreasing the efficiency of the fluid or its even range of viscosity.

None of the ingredients constituting the new composition have a detrimental effect upon rubber packing and to overcome any tendency of the fluid corroding the metals, an infinitesimal quantity of such rust inhibitor as sodium chromate may be added. In instances where the fluid contacts no metal the inhibitor may be eliminated.

Although heat is not necessary to the preparation and mixing of the ingredients it is preferable that, to insure complete assimilation of the ingredients, they be mixed at a temperature above normal such as, for example, at or near the boiling point.

I claim:

1. A fluid mixture composed of glucose from 20 to 75 per cent, alcohol from 40 to 12½ per cent, and water from 40 to 12½ per cent, with a minute quantity of sodium chromate.

2. A fluid mixture composed of glucose from 20 to 75 per cent, and a mixture of equal parts of alcohol and water from 80 to 25 per cent.

3. A fluid mixture for hydraulic mechanisms composed of glucose, alcohol, water and a rust inhibitor, the glucose constituting 20 to 75 per cent of the mixture.

4. A fluid for fluid pressure actuated mechanisms composed of glucose, alcohol, and water, the glucose constituting 20 to 75 per cent of the mixture.

5. A fluid composed of glucose, alcohol, water and sodium chromate, the glucose constituting 20 to 75 per cent of the mixture.

JOHN B. ROBINSON.